US007898427B1

(12) United States Patent
Kim

(10) Patent No.: US 7,898,427 B1
(45) Date of Patent: Mar. 1, 2011

(54) AUTOMATIC OVEN SHUTOFF FIRE PREVENTION

(76) Inventor: Steve H S Kim, Fremont, CA (US)

( * ) Notice: Subject to any disclaimer, the term of this patent is extended or adjusted under 35 U.S.C. 154(b) by 433 days.

(21) Appl. No.: 12/221,404

(22) Filed: Aug. 2, 2008

(51) Int. Cl.
*G08B 17/10* (2006.01)
*G08B 1/00* (2006.01)
*G08B 17/12* (2006.01)
*H02H 1/00* (2006.01)

(52) U.S. Cl. ........................ 340/628; 340/532; 340/577; 361/131

(58) Field of Classification Search ................. 340/501, 340/500, 531, 532, 628, 632, 577; 361/42, 361/59, 131
See application file for complete search history.

(56) References Cited

U.S. PATENT DOCUMENTS 6,032,663 A * 3/2000 Pencheon .................... 126/42
6,294,994 B1 * 9/2001 Hoellerich .................. 340/540
7,102,529 B2 * 9/2006 Whitney ..................... 340/628
7,817,048 B2 * 10/2010 Rouse et al. ................ 340/577
2004/0054921 A1 * 3/2004 Land, III .................... 713/200

* cited by examiner

*Primary Examiner*—Jennifer Mehmood
(74) *Attorney, Agent, or Firm*—Robert S. Smith

(57) ABSTRACT

A smoke/heat detector and alarm system for shutting off power to a heat generating appliance (gas or electric powered) when smoke/heat is detected. The system includes a smoke/heat detector that responds according to a selected one of four selectable modes. The system also includes a library of telephone numbers with corresponding emergency telephone numbers that are automatically dialed in response to reception of a Smoke alarm signal. The system is designed to avoid confusion that might otherwise be encountered when a plurality of such systems are operating in close proximity to one another.

8 Claims, 2 Drawing Sheets

A SCHEMATIC DIAGRAM OF THE RF SMOKE DETECTOR

A SCHEMATIC DIAGRAM OF THE RF SMOKE DETECTOR

A SCHEMATIC DIAGRAM OF THE RF ELECTRICAL OUTLET ADAPTER

A SCHEMATIC DIAGRAM OF THE RF GAS LINE OUTLET ADAPTER

A SCHEMATIC DIAGRAM OF THE RF PHONE DIALER

AUTOMATIC OVEN SHUTOFF FIRE PREVENTION

FIELD OF THE INVENTION

This invention relates to domestic fire prevention and particularly to fires originating from gas or electric stoves.

BACKGROUND AND INFORMATION DISCLOSURE

A principle cause of domestic fires is well known to originate from electric appliances and particularly from stoves, electric or gas fueled.

A particular factor that increases the cost of fire originating from stoves is that it is common practice to put a meal in the oven or to warm up on the stove and then to retire to another part of the house or "step outside" the house while the food is cooking. This is particularly true when the food being cooked is a roast or turkey or other item that often requires several hours for the cooking process.

Sometimes, the cook forgets that he has "something on the stove" and goes to a movie or other event and finds a house full of smoke/fire when he/she returns.

The technology of fire protection has grown over the years commensurate with advances in electronics.

For example, U.S. Pat. No. 5,297,636 discloses a fire extinguishing system for a residential cook-stove including a fire extinguisher mounted above a hood in a cabinet positioned in a cabinet over a cook stove. The fire extinguisher is connected by a flexible hose to nozzles within the hood to spray fire retardant over the cook-stove.

U.S. Pat. No. 7,176,805 B2 discloses an intelligent thermostat which, upon detection of a flammable gas regulates operation of appliances that have sources of ignition. This condition is detected by a flammable gas detector which then communicates with the appliances. The device may then send a visual signal to the occupant or sound and alarm.

U.S. Pat. No. 7,113,090 discloses a personal security network where an individual's system of security devices is connected to a central security system.

U.S. Pat. No. 6,965,313 discloses a personal security network where an individual's system of devices is connected to a central network. The user is enabled to set up personal alarms and alert services, to alert designated individuals.

U.S. Pat. No. 6,826,267 discloses an array of appliances controlled by a source of command fields defining operations to be performed within a contact sub-field.

U.S. Pat. No. 6,791,467 discloses a system for remotely controlling devices and includes an adaptive remote controller The remote controller is rf based and has the ability of two way communication with the devices.

U.S. Pat. No. 661,340 discloses a personal security network where an individual's system of security devices are connected to a central security network. The user may setup personalized alarms. And alert the individual when an alert situation occurs.

None of these devices address two immediate needs that a property owner requires when he is faced with the situation of imminent danger from fire particularly when he is "out of the house" and, for one reason or another has left his stove on and smoke is emanating from the stove.

One need is to disconnect power from the stove immediately upon receipt of the alarm signal.

Another need is to alert the owner to take immediate action such as calling a fire department particularly if he is not at home.

SUMMARY OF THE INVENTION

It is an object of this invention to provide a system for immediately turning off power to a stove (or oven) that is emitting smoke and/or heat.

It is another object to immediately alert the owner that the system has detected smoke, regardless of where the owner is located.

It is another object that the system be operable in any one of several modes, selected by the operator. These modes include:

a first mode where the object is simply to shut the power off and telephone a responsible party;

a second mode where the object is to transmit "ON" signal regardless of the status Smoke/heat detector such as when an operator simply requires that a responsible party be notified of an urgent need for help such as an ongoing burglary:

a third mode where the operator simply wishes to disempower the alarm for whatever reason;

a fourth mode where the operator wishes to delay turning the system on such as when smoke that has been generated has not been completely cleared.

It is another object that the system be selectively operable in an area of a plurality of such systems and it is required that response generated by a single system not be "crossed" with other systems.

This invention is directed toward a system which interrupts power (gas or electric) to a stove when the system detects smoke or heat in the vicinity of the stove. The system simultaneously sends a signal out to a selected phone.

The system includes a cordless detector that is placed within 25 meters from the stove The system also generates a continuous alarm until the user initiates a reset action.

The system also provides that the stove continue to operate, according to the discretion of the operator, if the smoke has not been completely cleared from the vicinity of the oven.

The present invention includes three RF sections.

One RF section is a SMOKE DETECTOR section that detects smoke and broadcasts detection of smoke and an address of the smoke detector Another RF section is an :RF OUTLET ADAPTER. that receives the combination signal and shuts off the power supply (electrical or gas) and provides to a Phone dialer the address of a designated party.

Another RF section is an RF Phone dialer that receives the transmitted signal including the phone number and calls the responsible party.

While the RF OUTLET ADAPTER receives an ON signal, power is provided uninterrupted to the stove for normal operation of the stove.

When the RF OUTLET ADAPTER receives an OFF signal, the RF adapter turns off power to the stove. Power remains OFF until a "reset" signal is received. The "reset signal" is generated by the operator.

In one version of the invention, the system is directed to the situation where there is only one isolated premise that must be provided with the smoke detection system.

In another version of the invention, such as a condominium or a complex of row houses, the system provides for several closely spaced premises where each premise requires independent protection.

In this latter situation, a memory of addresses and corresponding telephone numbers are made accessible to the function controllers arranged so that no cross interaction occurs that would confuse the operation of the system.

DISCUSSION OF THE DRAWINGS

Figure 1:
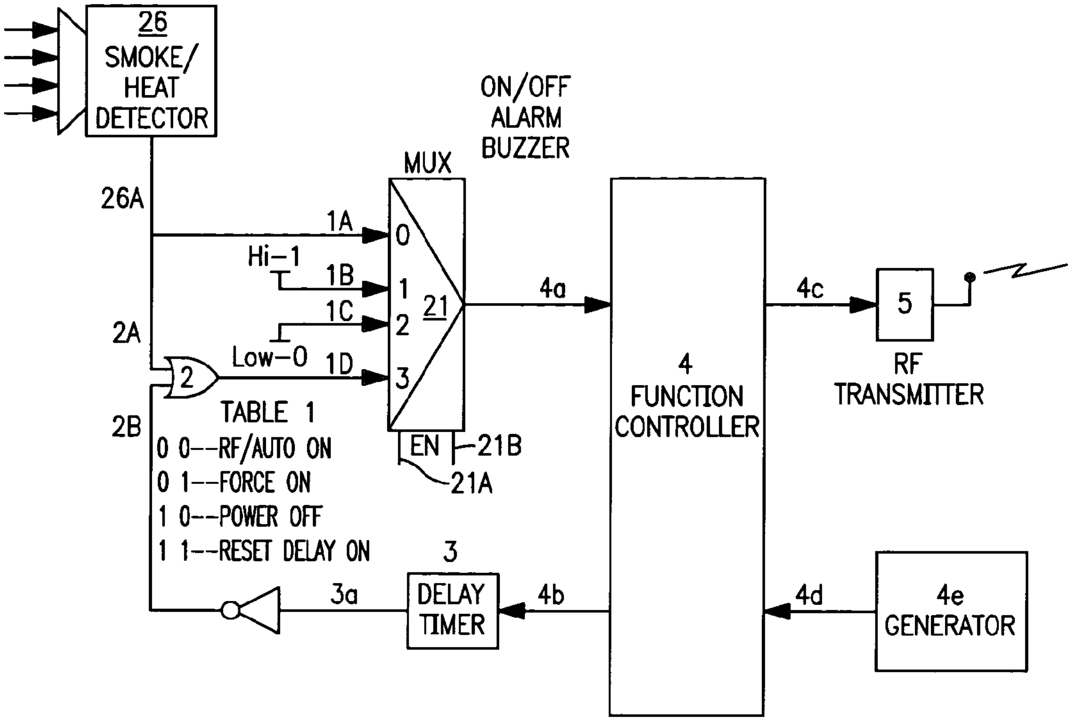
FIG. 1 is a schematic diagram of the RF Smoke detector section.
Figure 2A:
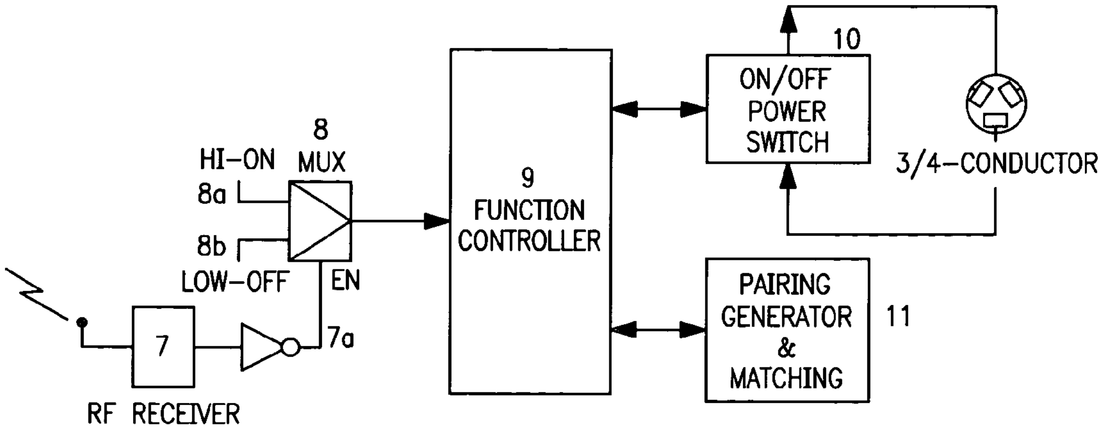
FIG. 2A is a schematic diagram of the RF Outlet Adapter for an electrically powered oven.
Figure 2B:
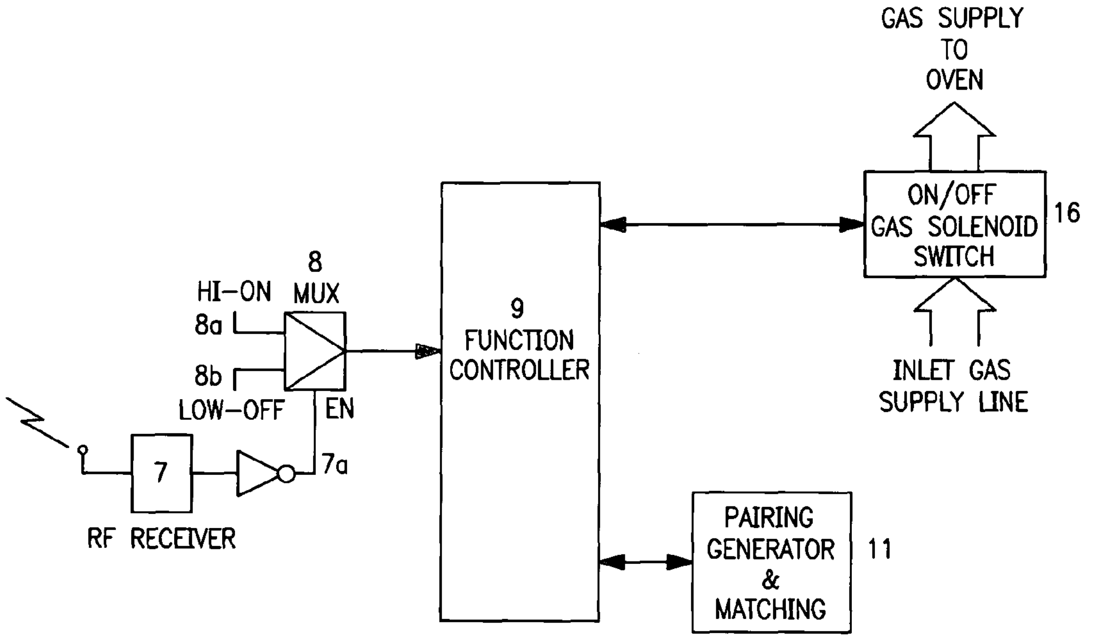
FIG. 2B is a schematic diagram of the RF Outlet Adapter for an electrically powered oven.
Figure 3:
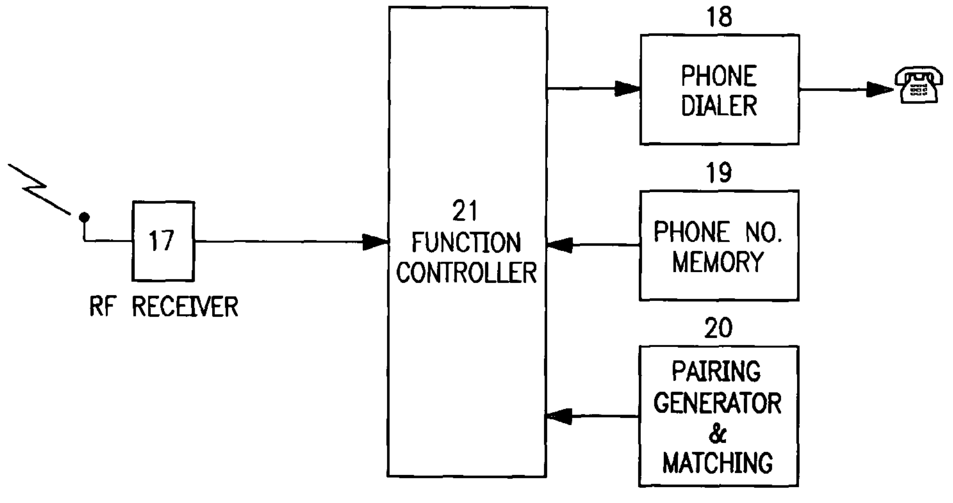
FIG. 3 is a schematic diagram of the RF Phone Dialer section.

Turning now to a discussion of the drawings, FIGS. 1-3 are schematic diagrams of the "AUTOMATIC OVEN SHUT OFF" system 10 of this invention.

The system 10 comprises:

the smoke detector section (FIG. 1)

the RF Adapter section, (FIG. 2A shows the adaptation to an electric oven and FIG. 2B shows the adaptation to a gas oven);

the phone dialer section (FIG. 3).

The smoke detector section (FIG. 1) includes a smoke detector 26 that sends a "smoke" signal to a 4-1 multiplexor. 21.

Multiplexor 21 responds to the Smoke signal according to a mode selected manually by closing combinations of switches 21A, and 21B. Inputs 21A and 21B are typically pushbutton switches that enable Multiplexor 21 to apply the selected mode (1*a*, 1*b*, 1*c*, 1*d*,) to functional controller 4.

Table I is the truth table for applying the combinations of input 21A, 21B to selecting as outputs, any one of the inputs (1A, 1B, 1C, 1D) to the multiplexor 21.

The operator (e.g., homeowner) selects an operating mode (inputs 1*a*, 1*b*, 1*c*, 1*d*) manually by pressing any one of the four enable combinations available at manual control 21A.

Input 1A of MUX 21 is connected directly to the smoke detector, 26, Manual selection of input 1A sets the system in the "auto detection mode". This is the normal operation mode. When the smoke/heat detector detects smoke or heat, the functional controller 4 turns. the RF transmitter 5 to 'smoke on' condition causing the RF Transmitter 5 to broadcast a "smoke on" signal. When the smoke detector 26 no longer detects smoke/heat. RF Transmitter will automatically turn off and transmit a "smoke off" signal.

Manual selection of input 1B to multiplexor, 21 will force the functional controller 4 to generate the RF transmitter "ON" signal regardless of the status Smoke/heat detector 26

Manual selection of signal input 1C applied to multiplexor 21 will turn the power off and shut the system down.

Manual selection of signal input 1D applied to multiplexor 21 applies signal input 26*a* from the Smoke Detector 26 "Ored" with signal input 2B to reset the system with a programmable time delay.

This mode is activated by the operator when he wishes the system to activate after a selected delay period.

In addition to the "mode signal" from the MUX 21 input into functional controller 4, an address (physical location) 4E of the smoke detector 26 is also input into the functional controller 21.

The address is written one time in an address register and is retained as a permanent reference for the operation of the system.

This arrangement ensures that the addresses of events of turning off power to the stove and calling a responsible telephone party correspond only to the address of the smoke detector originating the transmitted Smoke-address signal. Each system has a unique address and responds only to the matching address.

The functional controller 4 generates a "combined" signal being the "MUX" signal (representing mode from MUX 21) and the "address signal" from the Address register 5

The functional controller 4 passes the combined signal to the input terminal of RF Transmitter 5. The RF transmitter 5 broadcasts the combined signal to the RF Adapter section shown in FIG. 2A if the stove is electrically powered, or FIG. 2B if the stove is gas powered.

If there are numerous premises in the area requiring separate fire protection, then there are numerous entries in the address library 11 of the RF Adapter section. —one entry for each premise occupied by its own smoke detector 26.

FIG. 2A is a schematic diagram of the RF Outlet Adapter for an electrically powered oven. The Receiver 7 receives the combined signal from the RF transmitter 5. The output from Receiver 7 enables multiplexor 8. If the power 10 to the oven is ON, then a "high" signal 8*a* is input to multiplexor 8. causing multiplexor 8 to signal function controller 9 to turn the power switch 10 off.

The functional controller 9 will compare the address included in the combined signal to the address of an OFF/ON POWER switch 10 supplying electric power to oven conductor 19 to confirm that the incoming combined signal applies to the OFF/ON POWER switch 10.

If the power 10 to the oven is already OFF, then a "low" signal 8*b* is input to multiplexor 8 and multiplexor 8 will not respond to any input from the RF Receiver 7.

If the power 10 to the oven is ON, then a "hi" signal 8*b* is input to multiplexor 8 and multiplexor 8 will respond to any input from the RF Receiver 7. by turning the control of the solenoid switch OFF FIG. 2B is a schematic diagram of the RF Outlet Adapter for a gas powered stove. This version (FIG. 2B) is identical to the electric powered version (FIG. 2A) except that the functional controller 9 sets the on/off solenoid switch 16 to control (on-off) the gas supply to the gas oven, depending on the status high-on 13A or low off 13B.

FIG. 3 is a schematic diagram of the RF Phone dialer. The RF receiver 17 receivers the combined signal (Smoke-On-Address).

The functional controller 21 of the RF Phone adapter section applies the address portion of the signal using comparator 20 to lookup the phone number in the lookup table 19.

The functional controller 21 then applies the phone number to enable the phone dialer 18 to call a cell phone or emergency operator listed with the corresponding phone number in library 19.

A system has been described whose basic function is to detect a smoke/heat signal generated by an electrical/gas powered device, shut off power to the device, and phone a responsible party regarding the detection of the smoke/heat. The base parts of the system include a smoke detection section, a power shut off section, and a phone dialer section each working in combination with the other sections to accomplish the objectives of the system Modifications and variations of the invention may be contemplated after reading the specification and studying the drawings which are within the scope of the invention. I therefore wish to define the scope of my invention by the appended claims.

What is claimed is:

1. A system for protecting from fire, premises that include a heat generating appliance connected to a power source, said system comprising:

a signal generator means for generating a smoke-on signal in response to the presence of smoke on said premises;

a first multiplexor means for generating at an output terminal of said first multiplexor means, a MUX signal corresponding to a selectable mode of three modes of smoke signal input to said first multiplexor;

said selectable mode being any one of a.) said smoke-on signal when smoke is detected by a smoke detector;

b.) a continuous smoke-on signal;

c.) a continuous smoke-off signal;

any one of said three modes selected by manually setting a pair of enable switches of said MUX;

a memory means for storing a telephone number of a responsible party corresponding to an address of said smoke detector;

a first functional controller means connected to said memory means and to an output terminal of said first multiplexer means for generating a combined signal of said MUX signal and said stored telephone number;

a first RF transmitter means having an input terminal connected to an output terminal of said first multiplexor means for broadcasting a combined signal being a combination of said MUX signal and said stored telephone number a first RF receiver means having an input terminal for receiving said combined signal broadcast by said first RF transmitter means;

a second multiplexor means having an enable terminal connected to said first RF receiver means for receiving said broadcast combined signal; and said second multiplexor means having a first input terminal connected to a hi-on signal; and said second multiplexor means having a second input terminal connected to a low-off signal;

said hi on signal being a part of said MUX signal activated when said smoke detector generates said smoke on signal;

said low off signal activated when said smoke detector generates no smoke on signal;

an ON/OFF solenoid switch means having a control terminal connected to an output terminal of said second multiplexor means; and said ON/OFF solenoid switch means arranged for controlling power to said heat generating appliance;

a second RF receiver means for receiving said combined signal from said RF transmitter means;

a second functional controller means having an input terminal connected to said second RF receiver means for receiving said combined signal;

a third functional controller means connected to a phone dialer arranged to call said stored telephone number to announce a smoke-on signal at said stored address.

2. The system of claim 1 further comprising:

a delay timer having an input terminal connected to said first functional controller means;

an inverter having an input terminal connected to an output terminal, of said delay timer;

an AND gate having an output terminal connected to an input terminal of said first multiplexer and one input terminal connected to an output terminal of said inverter and another input terminal connected to an output terminal of said smoke detector;

said first multiplexor, delay timer, inverter and AND gate providing a fourth mode for inputting said smoke-on signal from said smoke detector in which said smoke-on signal is emitted from said output terminal of said first multiplexor after a delay period starting when said smoke detector first detects smoke.

3. The system of claim 1 wherein said power source is gas.

4. The system of claim 1 wherein said power source is electric.

5. A system for protecting a plurality of premises from fire wherein each premise has a heat generating appliance connected to a power source, said system comprising at least one subsystem with an address, one subsystem for each premise wherein each subsystem includes:

a signal generator means for generating a smoke-on signal in response to the presence of smoke on said premise;

a first multiplexor means for generating at an output terminal of said first multiplexor means, a MUX signal corresponding to a selectable mode of three modes of smoke signal input to said first multiplexor means;

said selectable mode being any one of:

d.) a smoke-on signal when smoke is detected by said smoke detector;

e.) a continuous smoke-on signal;

f.) a continuous smoke-off signal;

any one of said three modes selected by manually setting a pair of enable switches of said first multiplexor means;

a memory means for storing an address of said premise of said smoke detector;

a first functional controller means having an input terminal connected to an output terminal of said first multiplexor means and another input terminal connected to said memory means for generating a combined signal of said MUX signal and said address of said smoke detector;

a first RF transmitter means having an input terminal connected to an output terminal of said first multiplexor means for broadcasting a combined signal being a combination of said MUX signal and said stored telephone number a first RF receiver means having an input terminal for receiving said combined signal broadcast by said first RF Transmitter;

a second multiplexor means having an enable terminal connected to said first RF receiver means for receiving said broadcast combined signal; and said second multiplexor means having a first input terminal connected to a hi-on signal; and said second multiplexor means having a second input terminal connected to a low-off signal;

said hi-on signal being a part of said MUX signal activated when said smoke detector generates said smoke-on signal;

said low-off signal activated when said smoke detector generates no smoke on signal;

a first library means for storing addresses and corresponding emergency telephone numbers of each premise of said at least one premise;

an ON/OFF solenoid switch means having a control terminal connected to an output terminal of a second functional controller means; and said ON/OFF solenoid switch means arranged for controlling power to said heat generating appliance;

said second functional controller means having:

a.) a second input terminal connected to said first library means for confirming address to shut off power to said solenoid switch;

b.) a first input connection to said second multiplexor means for receiving said combined signal;

a second RF receiver means for receiving said combined signal from said RF transmitter means;

a third functional controller means having an input terminal connected to said second RF receiver for receiving said combined signal;

a second library means for storing addresses and corresponding emergency telephone numbers of each premise of said at least one premise;

said third functional controller means connected to said second library means wherein said third functional controller means is arranged to provide said telephone number of said smoke detector to said third functional controller means;

said third functional controller means connected to a phone dialer arranged to call said stored telephone number provided by said library to announce said smoke-on signal at said stored address.

6. The system of claim 1 further comprising:

a delay timer having an input terminal connected to said first function controller;

an inverter having an input terminal connected to an output terminal, of said delay timer;

an AND gate having an output terminal connected to an input terminal of said first multiplexer means and one input terminal connected to an output terminal of said inverter and another input terminal connected to an output terminal of said smoke detector;

said first multiplexor means, variable delay timer, inverter and AND gate providing a fourth mode for inputting a smoke-on signal from said smoke detector in which said smoke-on signal is emitted from said output terminal of said first multiplexor means after a delay period starting when said smoke detector first detects smoke.

7. The system of claim 6 wherein said appliance is heated by gas.

8. The system of claim 6 wherein said appliance is heated by gas.

* * * * *